United States Patent
Fu et al.

(10) Patent No.: US 11,494,931 B2
(45) Date of Patent: Nov. 8, 2022

(54) DRILLING CALIBRATION METHOD, APPARATUS, DEVICE AND MEDIUM BASED ON IMAGE RECOGNITION

(71) Applicant: INSTITUTE OF GEOLOGY AND GEOPHYSICS, CHINESE ACADEMY OF SCIENCES, Beijing (CN)

(72) Inventors: Changmin Fu, Beijing (CN); Xiaotian Wang, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/616,524

(22) PCT Filed: Nov. 24, 2020

(86) PCT No.: PCT/CN2020/130972
§ 371 (c)(1),
(2) Date: Dec. 3, 2021

(87) PCT Pub. No.: WO2021/104222
PCT Pub. Date: Jun. 3, 2021

(65) Prior Publication Data
US 2022/0270281 A1    Aug. 25, 2022

(30) Foreign Application Priority Data

Nov. 26, 2019   (CN) .......................... 201911175237.2
Nov. 20, 2020   (CN) .......................... 202011311422.2

(51) Int. Cl.
*G06T 7/70*     (2017.01)
*G01S 17/08*    (2006.01)
(Continued)

(52) U.S. Cl.
CPC ................ *G06T 7/70* (2017.01); *E21B 47/04* (2013.01); *G01S 17/08* (2013.01); *G06T 2207/30164* (2013.01)

(58) Field of Classification Search
None
See application file for complete search history.

(56) References Cited

U.S. PATENT DOCUMENTS

2013/0271576 A1   10/2013   Ellis
2013/0345878 A1   12/2013   Austefjord et al.
2018/0363392 A1   12/2018   Brandsvoll et al.

FOREIGN PATENT DOCUMENTS

CN    101942976 A    1/2011
CN    202064839 U    12/2011
(Continued)

OTHER PUBLICATIONS

International Search Report (Form PCT/ISA/210) dated Feb. 23, 2021 in corresponding PCT Application No. PCT/CN2020/130972 (4 pages) (4 pages English Translation).
(Continued)

*Primary Examiner* — Edemio Navas, Jr.
(74) *Attorney, Agent, or Firm* — Staas & Halsey LLP

(57) ABSTRACT

A drilling calibration method, apparatus, device and medium based on image recognition includes lifting a top drive to a position of a derrick, and receiving and recognizing a target image acquired by an image acquisition apparatus of an operating terminal; calculating a quantity of pixels from the top drive to a rotary table surface in the target image by a data processing unit of the operating terminal; and receiving a height of the top drive measured by a diastimeter by the operating terminal. The height of the top drive is a height from the top drive to the rotary table surface. A pixel relationship table may be established between the quantity of the pixels from the top drive to the rotary table surface and
(Continued)

the height of the top drive by a calibration unit of the operating terminal to finish drilling calibration. The pixel relationship table may be determined between the quantity of the pixels from the top drive to the rotary table surface and the height of the top drive by an image recognition technique to finish calibration of drilling, so that influence of a drilling environment to drilling calibration may be reduced greatly.

10 Claims, 8 Drawing Sheets

(51) Int. Cl.
    *E21B 44/00*   (2006.01)
    *E21B 7/20*    (2006.01)
    *E21B 47/04*   (2012.01)

(56) References Cited

FOREIGN PATENT DOCUMENTS

| | | | |
|---|---|---|---|
| CN | 102788568 A | 11/2012 | |
| CN | 104132613 A | 11/2014 | |
| CN | 104240264 A | 12/2014 | |
| CN | 104343438 A | 2/2015 | |
| CN | 104632193 A | 5/2015 | |
| CN | 105672870 A | 6/2016 | |
| CN | 109328256 A * | 2/2019 | ............ E21B 19/00 |
| CN | 109328256 A | 2/2019 | |
| CN | 112196518 A | 1/2021 | |
| WO | WO 2010/014826 A2 | 2/2010 | |
| WO | WO 2019/169067 A1 | 9/2019 | |

OTHER PUBLICATIONS

Written Opinion (Form PCT/ISA/237); dated Feb. 23, 2021 in corresponding PCT Application No. PCT/CN2020/130972 (5 pages).
Office Action dated Feb. 26, 2021 in corresponding Chinese Patent Application No. 202011311422.2 (12 pages).
Notice of Allowance dated Apr. 2, 2021 in corresponding Chinese Patent Application No. 202011311422.2 (4 pages).
Written Opinion (Form PCT/ISA/237) as Office of Earlier Examination (OWEE); dated Feb. 23, 2021 in corresponding PCT Application No. PCT/CN2020/130972 (5 pages) (5 pages English Translation).

* cited by examiner

DRILLING CALIBRATION METHOD, APPARATUS, DEVICE AND MEDIUM BASED ON IMAGE RECOGNITION

CROSS REFERENCE TO RELATED APPLICATIONS

This application is a U.S. National Stage Application under 35 U.S.C. § 371 of PCT International Patent Application No. PCT/CN2020/130972, filed on Nov. 24, 2020, which claims the foreign priority benefit under 35 U.S.C. § 119 of Chinese Patent Application No. 201911175237.2, filed on Nov. 26, 2019, and Chinese Patent Application No. 202011311422.2, filed on Nov. 20, 2020, both filed in the China National Intellectual Property Administration, the contents of which International Patent Application and the Chinese Applications are incorporated by reference herein in their entirety.

TECHNICAL FIELD

The present disclosure relates to the technical field of drilling, and in particular to a drilling calibration method, apparatus, device and medium based on image recognition.

BACKGROUND

Before operation, it is necessary to calibrate a drilling system, so that the drilling system finishes drilling work during drilling according to a calibration result.

In the prior art, most drilling calibration methods are too complex and may be implemented by meeting specific conditions. However, sometimes, a drilling environment is complex and variable, for example, drilling is affected by severe weather such as gale. Errors often appear in drilling calibration, so that measured values may not be used as errors between the measured values of drilling and true values are too large.

SUMMARY

One or more embodiments of the description provide a drilling calibration method, apparatus, device and medium based on image recognition to solve the technical problems below: in the prior art, most drilling calibration methods are too complex and may be implemented by meeting specific conditions. However, sometimes, a drilling environment is complex and variable. Errors often appear in drilling calibration, so that measured values may not be used as errors between the measured values of drilling and true values are too large.

In order to solve the technical problems, one or more embodiments of the description are implemented below:

The embodiments of the description provide a drilling calibration method based on image recognition, the method including:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

The embodiments of the description provide a drilling calibration apparatus based on image recognition, the apparatus including:

a top drive moving unit, configured to lifting a top drive to a preset position of a derrick;

an image recognition unit, configured to receive and recognize a target image acquired by an image acquisition apparatus;

a data processing unit, configured to calculate a quantity of pixels from the top drive to a rotary table surface in the target image;

a data processing unit, configured to receive a height of the top drive measured by a diastimeter, wherein the height of the top drive is a height from the top drive to the rotary table surface; and a calibration unit, configured to establish a pixel relationship table between the quantity of the pixels from the top drive to the rotary table surface and the height of the top drive to finish drilling calibration.

The embodiments of the description provide a drilling calibration device based on image recognition, the device including:

at least one processor; and a memory in communication connection with the at least one processor, wherein the memory stores an instruction capable of being executed by the at least one processor, and the instruction is executed by the at least one processor, so that the at least one processor may:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

One or more embodiments of the description provide a drilling calibration medium based on image recognition, having a computer executable instruction stored thereon, the computer executable instruction being configured to:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

The at least one technical scheme adopted by the one or more embodiments of the description may achieve the following beneficial effects: the embodiments of the description determine the pixel relationship table between the quantity of the pixels from the top drive to the rotary table surface and the height of the top drive by means of an image recognition technique to finish calibration of drilling, so that influence of a drilling environment to drilling calibration is reduced greatly.

BRIEF DESCRIPTION OF THE DRAWINGS

In order to describe the embodiments of the description or the technical scheme in the prior art more clearly, brief introduction on drawings needed to be used in the embodiment will be made below. It is obvious that the drawings described below are some embodiments of the description, and those skilled in the technical field further can obtain other drawings according to the drawings without creative efforts.

DETAILED DESCRIPTION

In order to make those skilled in the art better understand the technical schemes of the description, clear and intact description will be made on the technical schemes in the embodiments below in combination with drawings in the embodiments of the description. Apparently, the described embodiments are merely a part of embodiments of the application and are not all the embodiments. On a basis of the embodiments in the description, all other embodiments obtained by those skilled in the technical field without creative efforts shall fall into the scope of protection of the application.

Explanation of Nouns

A top drive system is a power system for drilling. Only a horn mouth and the hook of the top drive are involved in the embodiments of the description, and the horn mouth of the top drive (top drive for short below) is configured to connect the top drive system and the drilling tool to get through slurry and transfer power. The hook is configured to clamp the drilling tool to move in the pull-out-of-hole process and the drill-down process, and for tools that may not be clamped by the hook, for example, MWD, a short drill pipe or a lifting sub is usually used in a well site to be matched with the hook to work.

The slips fill a space between the drilling tool and a mouth of a well to clamp the drilling tool to the rotary table surface and the weight of the whole drilling tool string is born by the rotary table surface.

The slips-sitting state is as follows: the drilling tool is locked by the slips to the rotary table surface of a drilling platform, and the top drive no longer bears the weight of the whole drilling tool and the weight of the top drive is carried by the slips and the derrick.

The slips-releasing state is as follows: after the slips is removed, the top drive carries the whole drilling tool to move up and down and the top drive bears the weight of the whole drilling tool.

Figure 1:
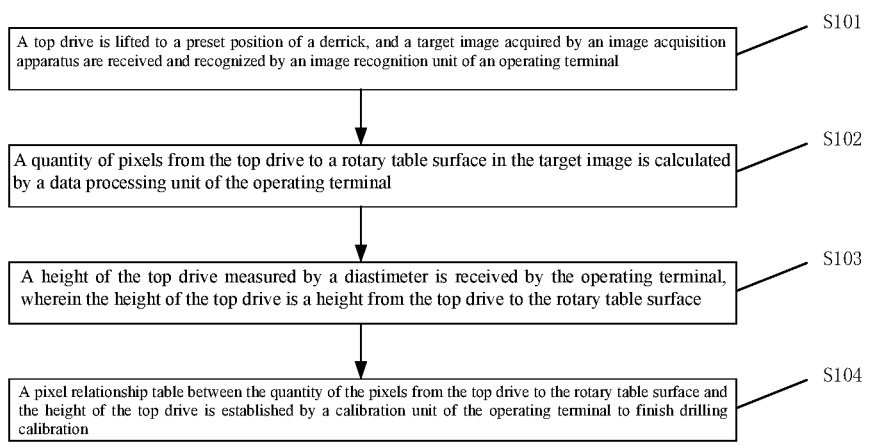
FIG. 1 is a flow diagram of a drilling calibration method based on image recognition provided by the embodiments of the description.

FIG. 1 is a flow diagram of a drilling calibration method based on image recognition provided by the embodiments of the description. The embodiments of the description may execute the following steps by an executing unit of the drilling system, the method including the following steps:

S101, a top drive is lifted to a preset position of a derrick, and a target image acquired by an image acquisition apparatus are received and recognized by an image recognition unit of an operating terminal.

In the step S101 of the embodiments of the description, the full name of the top drive is Top Drive Drilling System (TDS) which is a top drive drilling system. The top drive may rotate a drill pipe of the drilling tool directly from an upper space of the derrick, and feeds the drill pipe downward along a dedicated guide rail to finish various drilling operations such as rotary drilling of the drill pipe, circulating of a drilling fluid, connecting of a column, shackling, back reaming and the like. Drilling tool rotation and drill-pipe stand connection and detachment of the top drive drilling apparatus are a more effective method.

In the step S101 of the embodiments of the description, the preset position may be a preset position from the rotary table surface, for example, 10 cm, 20 cm and the like from the rotary table surface, which may be arranged according to an actual condition.

In the step S101 of the embodiments of the description, the image acquisition apparatus may be a camera and may acquire the target image, wherein the target image may set the angle of the image acquisition apparatus in advance, so that the target image is acquired.

S102, a quantity of pixels from the top drive to a rotary table surface in the target image is calculated by a data processing unit of the operating terminal.

S103, a height of the top drive measured by a diastimeter is received by the operating terminal, wherein the height of the top drive is a height from the top drive to the rotary table surface.

In the step S103 of the embodiments of the description, the diastimeter may be a laser diastimeter.

S104, a pixel relationship table between the quantity of the pixels from the top drive to the rotary table surface and the height of the top drive is established by a calibration unit of the operating terminal to finish drilling calibration.

Figure 2:
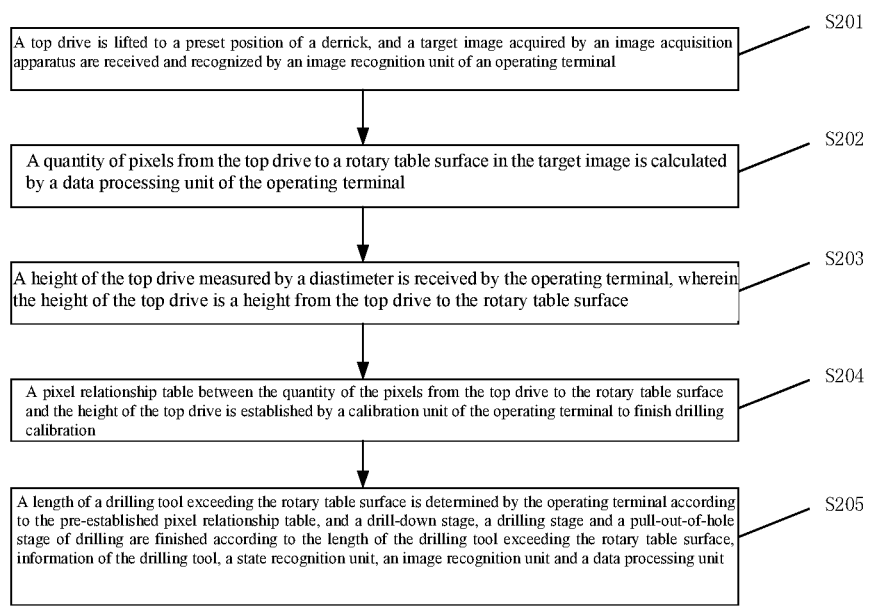
FIG. 2 is a flow diagram of another drilling calibration method based on image recognition provided by the embodiments of the description.

Corresponding to the embodiments of FIG. 1, FIG. 2 is a flow diagram of another drilling calibration method based on image recognition provided by the embodiments of the description. The embodiments of the description may execute the following steps by an executing unit of the drilling system, the method including the following steps:

S201, a top drive is lifted to a preset position of a derrick, and a target image acquired by an image acquisition apparatus are received and recognized by an image recognition unit of an operating terminal.

S202, a quantity of pixels from the top drive to a rotary table surface in the target image is calculated by a data processing unit of the operating terminal.

S203, a height of the top drive measured by a diastimeter is received by the operating terminal, wherein the height of the top drive is a height from the top drive to the rotary table surface.

In the step S103 of the embodiments of the description, the diastimeter may be a laser diastimeter.

S204, a pixel relationship table between the quantity of the pixels from the top drive to the rotary table surface and the height of the top drive is established by a calibration unit of the operating terminal to finish drilling calibration.

S205, a length of a drilling tool exceeding the rotary table surface is determined by the operating terminal according to the pre-established pixel relationship table, and a drill-down stage, a drilling stage and a pull-out-of-hole stage of drilling are finished according to the length of the drilling tool exceeding the rotary table surface, information of the drilling tool, a state recognition unit, an image recognition unit and a data processing unit, wherein the information of the drilling tool includes a quantity of the drilling tools and the length of each drilling tool. The state recognition unit is configured to switch the drilling state so as to determine a drilling depth of a drill bit according to different drilling states.

In the drill-down stage of the embodiments of the description, the drilling depth in the drill-down stage is set as a first preset value, so that the drilling depth of the drill bit is increased from zero to the first preset value. The first preset value may be set as needed, for example, the first preset value may be 300 m or 400 m.

In the drilling stage of the embodiments of the description, the drilling tool is driven to rotate integrally by the top drive and the drilling depth is set as a second preset value, so that the drilling depth of the drill bit is increased from the first preset value to the second preset value step by step. The second preset value may be set as needed, for example, the second preset value may be 1000 m or 2000 m. In the drilling process, a usual drilling depth is equal to the drilling depth in real time.

In the pull-out-of-hole stage of the embodiments of the description, the drilling depth of the drill bit is decreased from the second preset value to zero step by step.

The drill-down stage may specifically includes:

the first drilling tool is vertically connected to a bottom of the top drive via a hook by the operating terminal, the drill bit is mounted at the bottom of the first drilling tool, and lengths of the first drilling tool and the drill bit are recorded;

when the position of the drill bit is aligned with the rotary table surface, the drilling depth as zero is recorded by the operating terminal, and the drilling state is set as a slips-releasing state;

the first drilling tool is driven to move downwards via the hook, and a distance from a top surface of the first drilling tool to the rotary table surface and a current height of the top drive by the image recognition unit are recognized;

a current drilling depth of the drill bit is calculated according to the length of the first drilling tool, the length of the drill bit and the distance from the top surface of the first drilling tool to the rotary table surface, wherein the distance between the top drive to the top surface of the first drilling tool is stable and invariable;

when the first drilling tool is moved downwards to the lowest point via the hook, slips is placed on the rotary table surface to fix the first drilling tool;

the first drilling tool is loosened by the hook and the top drive, together with the hook, is moved upwards;

a distance change between the top drive and the top surface of the first drilling tool is recognized by the image recognition unit and the data processing unit, and the drilling state to a slips-sitting state is changed by the state recognition unit;

when the height of the top drive is moved upwards to the highest point, a second drilling tool to the top surface of the first drilling tool is vertically connected, and a length of the second drilling tool is recorded;

a top surface of the second drilling tool is recognized by the image recognition unit, when the distance between the top drive and the top surface of the second drilling tool is stable and invariable, the drilling state is changed to the slips-releasing state by the state recognition unit, and the slips taken out for the convenience of movement of the top drive downwards, and the current drilling depth of the drill bit is calculated; and the steps are executed repeatedly, and the drilling depth of drilling reaches the first preset value when the $n^{th}$ drilling tool is connected, wherein n is a positive integer greater than 1.

It is to be noted that when the steps are executed repeatedly, the subsequent operations of the second drilling tool, the third drilling tool and the subsequent drilling tools are same, which is no longer described in detail in the embodiments of the description.

The drilling stage may specifically includes:

when the nth drilling tool is vertically connected to the top surface of the previous drilling tool, slips is placed to the rotary table surface, and the top drive is moved downwards to connect the nth drilling tool to pump slurry;

a distance change between the top drive and the top surface of the nth drilling tool is recognized by the image recognition unit and the data processing unit;

the drilling state is changed to the slips-sitting state by the state recognition unit, wherein the depth of the drill bit is invariable, the height of the top drivel is decreased gradually, the distance between the top drive and the top surface of the nth drilling tool is decreased gradually to zero, and the top drive is connected to the top surface of the $n^{th}$ drilling tool by way of rotating a first preset direction;

an overlap value of an overlap portion between the top drive and the nth drilling tool is recorded by the operating terminal, and an angular speed of the top drive that rotates in the first preset direction is recorded;

when the image recognition unit and the data processing unit recognize that the overlap value is a preset overlap value and the angular speed of the top drive that rotates in the first preset direction is zero, the drilling state is switched to the slips-releasing state and the slips is removed;

the current drilling depth of the drill bit is determined according to the length of the drill bit, a sum of the lengths of the n drilling tools, the current height of the top drive and the preset overlap value;

slips is placed on the rotary table surface, wherein the top drive rotates along a second preset direction to separate the top drive from a drill pipe of the drilling tool, the state recognition unit switches the drilling state to the slips-sitting state, and furthermore, the depth of the drill bit is invariable and the top drive moves upwards to the top end;

the (n+1)th drilling tool is vertically connected to the top surface of the nth drilling tool and the top drive is moved downwards to connect the (n+1)th drilling tool;

when the data processing unit recognizes that the distance between the top drive and the top surface of the (n+1)th drilling tool is zero, the (n+1) th drilling tool does not rotate, and the top drive rotates along the first preset direction to drill the top surface of the drilling tool;

an overlap value of an overlap portion between the top drive and the (n+1)th drilling tool is recorded by the operating terminal, and an angular speed of the top drive that rotates in the first preset direction is recorded;

when the image recognition unit and the data processing unit recognize that the overlap value is a preset overlap value and the angular speed of the top drive that rotates in the first preset direction is zero, the drilling state is switched to the slips-releasing state and removing the slips;

the current drilling depth of the drill bit is determined according to the length of the drill bit, a sum of the lengths of the (n+1) drilling tools, the current height of the top drive and the preset overlap value; and the steps are executed repeatedly, and the drilling depth of drilling reaches the second preset value when the last drilling tool is connected.

It is to be noted that when the steps are executed repeatedly, and the drilling depth of drilling reaches the second preset value when the (n+2) th drilling tool and the (n+3)th drilling tool are connected respectively till the last drilling tool is connected.

The pull-out-of-hole stage may specifically includes:

slips is placed to the rotary table surface, and when the processing unit recognizes that the distance between the top surface of the last drilling tool and the top drive is zero, the last drilling tool is static and the top drive rotates along the second preset direction, changing the drilling state to the slips-sitting state by the state recognition unit;

when the top drive is separated from the last drilling tool, the last drilling tool is connected via the hook, when the distance between the top drive and the top surface of the last drilling tool is increased to be stable and invariable, the drilling state is changed to the slips-releasing state by the state recognition unit, taking out the slips, all the drilling tools are driven to lift integrally via the hook, and the current drilling speed of the drill bit is determined;

when all the drilling tools are integrally lifted to the highest point, slips is placed on the rotary table surface to fix all the drilling tools;

when the image recognition unit and the data processing unit recognizes that the distance between the last drilling tool and the top drive is decreased gradually, the drilling state is changed to the slips-sitting state by the state recognition unit and detachment of the last drilling tool is finished; and the steps are executed repeatedly till the first drilling tool to finish detachment of all the drilling tools.

Rotation in the first preset direction may be rotation in a clockwise direction and rotation in the second preset direction may be rotation in an anti-clockwise direction.

Figure 3:
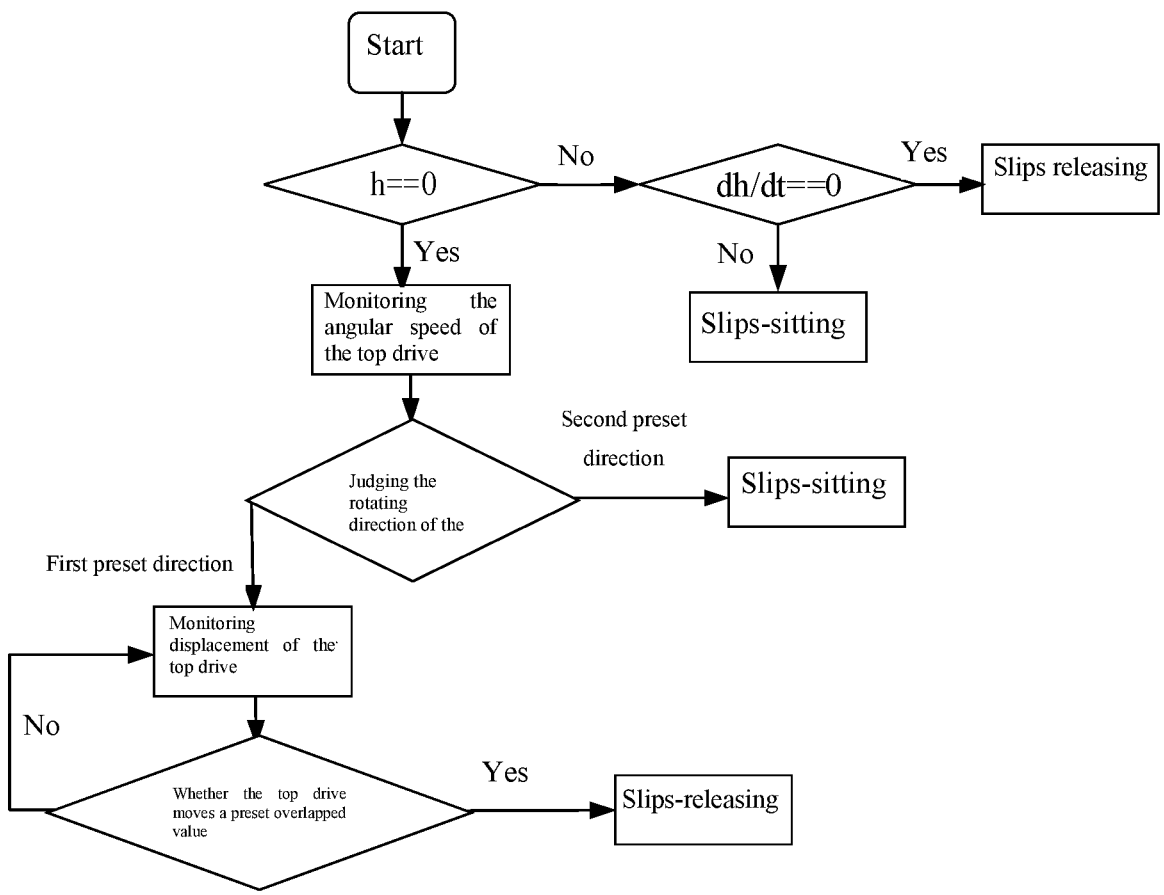
FIG. 3 is a flow diagram of state recognition by a state recognition unit provided by the embodiments of the description.

Further, the state recognition unit is configured to switch the drilling state. Referring to the flow diagram of state recognition of the state recognition unit shown in FIG. 3, it specifically includes:

whether the distance between the top drive and the top surface of the topmost drilling tool is zero or not is judged;

whether the distance between the top drive and the top surface of the topmost drilling tool is changed or not is judged if it is judged that the distance between the top drive and the top surface of the topmost drilling tool is not zero;

it is judged that the drilling state is changed to the slips-sitting state if it is judged that the distance between the top drive and the top surface of the topmost drilling tool is changed; and it is judged that the drilling state is changed to the slips-releasing state if it is judged that the distance between the top drive and the top surface of the topmost drilling tool is not changed.

If whether the distance between the top drive and the top surface of the topmost drilling tool is zero or not is judged, the method may further includes:

the angular speed of the top drive is monitored and a rotating direction of the top drive is judged;

a moving distance of the top drive is monitored if it is judged that the top drive rotates along the first preset direction, and whether the top drive moves at the preset overlap value or not is judged;

it is judged that the drilling state is changed to the slips-releasing state if it is judged that the top drive moves at the preset overlap value; and it is judged that the drilling state is changed to the slips-sitting state if it is judged that the top drive rotates along the second preset direction.

If it is judged that the top drive does not rotate, whether the height of the top drive is changed or not is judged;

it is judged that the drilling state is the slips-releasing state if it is judged that the height of the top drive is changed;

if it is judged that the height of the top drive is not changed, the height of the top drive is monitored continuously.

In the embodiments of the description, adding or subtracting accumulation may be carried out on the distance between the top drive and the rotary table surface according to different states of the drilling tool to obtain a real-time position value of the drill bit so as to obtain a well depth numerical value.

Rotation in the first preset direction may be rotation in a clockwise direction and rotation in the second preset direction may be rotation in an anti-clockwise direction.

A well depth survey mode adopted in existing drilling engineering is a calculation mode of combining a winch sensor with a hanging load sensor. The former may record the rotating number of turns of a rolling shaft of a winch and record the distance from the top drive to the rotary table surface at the time simultaneously so as to determine a corresponding relationship (the step is referred as to calibration) between the rotating number of turns and the distance; the latter judges the slips-sitting or slips-releasing state by means of change of tension of a drilling mooring rope, and in most cases, if the numerical value of the hanging load sensor is relatively small (the tension of the mooring rope is relatively small), it is indicated that the drilling state is the slips-sitting state at the time, up-down movement of the top drive is not counted in the depth of the drill bit and the well depth, and if the numerical value of the hanging load sensor is relatively large (the tension of the mooring rope is relatively large), it is indicated that the drilling state is the slips-releasing state, and up-down movement of the top drive is counted in the depth of the drill bit and the well depth.

Figure 4:
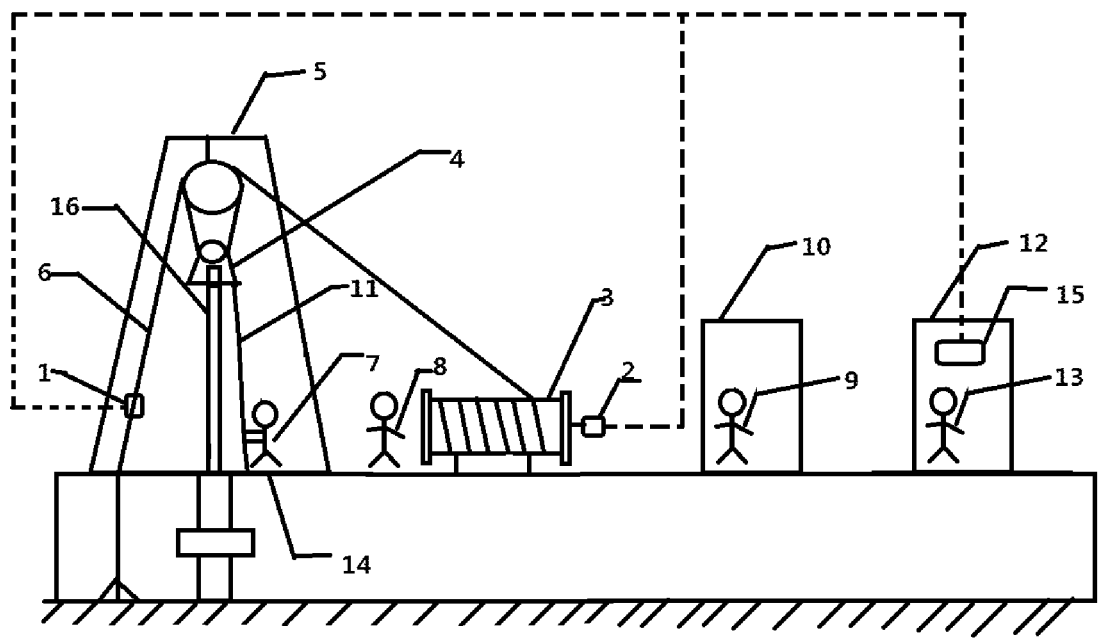
FIG. 4 is a structural schematic diagram of work of a drilling system in the prior art provided by the embodiments of the description.

The mooring rope in the winch is to be rolled in several layers together, and retraction and release of the mooring rope decide up-down movement of the top drive. On the premise that the moving distance of the top drive is same, when there are more layers, the rotating diameter of the mooring rope is relatively large, the number of turns the winch needs to rotate is relatively small. When there are few layers, the rotating diameter of the mooring rope is relatively small, the number of turns the winch needs to rotate is relatively large. In the calibration step, it is necessary to record the rotating number of turns at the time and the distance from the top drive to the rotary table surface when some layer of the mooring rope is just released and a new layer is to be released. It is necessary to pre-judge the critical state by an engineer. As the driving environment is complex and variable, errors usually appear. In case of drilling resistance or blockage, tension of the drilling mooring rope is to change abnormally, so that hanging load sensor generates a wrong response, thereby bringing a well depth survey error immediately. When the mooring rope is wound and damaged, it is necessary to cut the mooring rope again, and at the time, the calibration coefficient is canceled. These errors will be accumulated continuously along the drilling process, so that the measured values may not be used as errors between the measured values of drilling and true values are too large. Referring to FIG. 4, it illustrates a structural schematic diagram of work of the drilling system in the prior art. It includes specific operating steps:

A driller 9 in a driller room 10 may control the top drive 4 to carry the drilling tool 16 to move up and down in the derrick 5 via the winch 3, the winch sensor 2 is mounted on the winch 3 and may record the rotating number of turns of the winch 3 and transfer the rotating number of turns to the operating terminal 15 via a cable, and the engineer 13 in a well-logging-during-drilling working cabin 12 may acquire the rotating number of turns of the winch sensor 2 at the time via the operating terminal 15. When the top drive 4 is located at the highest point of the derrick 5, the mooring rope in the winch 3 is in the retracted state and usually 4-5 layers are retracted. When the top drive 4 moves downwards, the mooring rope is released continuously from the winch 3.

The drilling system may include the calibrating steps:

1. The engineer 7 requires the driller 9 to move the top drive 4 downwards to the lowest point from the rotary table surface 14.

2. The engineer 7 binds a meter ruler 11 to the top drive 4 and records the height between the position and the rotary table surface 14, and informs an engineer 13 located in the well-logging-during-drilling working cabin 12 with readings.

3. The engineer 13 acquires the rotating number of turns of the current winch 3 via the operating terminal 15 and records the height informed by the engineer 7 correspondingly, and after the engineer 13 records the height, the engineer 7 is informed to operate continuously.

4. The engineer 7 informs the driller 9 to lift the top drive 4, the engineer 8 pays attention to change of the mooring rope of the winch 3 in real time, and when the mooring rope in the winch 3 is just retracted in the first layer, the driller 9 is informed to lock the top drive 4.

5. The engineer 7 records the height from the top drive 4 to the rotary table surface 14 at the time by using the meter ruler 11 and informs the engineer 13 with the numerical value.

6. The engineer 13 repeats the step 3.

7. The engineer 7 informs the driller 9 to lift the top drive 4, the engineer 8 pays attention to change of the mooring rope of the winch 3 in real time simultaneously, and when the mooring rope in the winch 3 is just retracted in the second layer, the driller 9 is informed to lock the top drive 4.

8. The steps 5-7 are repeated till the top drive 4 arrives at the highest point of the derrick 5.

After the step 8, a depth tracking software 15 will record a corresponding relationship formed between the rotating number of turns of the winch 3 at different rotating diameters and the real-time height intactly to finish the whole calibration process. After the calibration process is finished, a tape measure is detached.

The hanging load sensor 1 is mounted on a drilling line 6 to monitor the slips-sitting and slips-releasing states of the drilling tool 16, and adding or subtracting accumulation may be carried out on the distance between the top drive 4 and the rotary table surface 14 according to different states to obtain a real-time position value of the drill bit so as to obtain a well depth numerical value.

The steps in the prior art have the defects below:

1. The calibration steps are tedious and the time consumed is relatively long, and meanwhile, four engineers are needed to cooperate.

2. It is necessary to mount the winch sensor, and it is necessary to pre-judge the change position of the mooring rope by the engineers manually during calibration, so that the result is inaccurate.

3. It is necessary to mount the hanging load sensor, which may result in a response error of the hanging load sensor under special conditions, and the result is inaccurate.

In the embodiments of the description, the problems below may be solved:

It is necessary for a plurality of engineers to cooperate to work in a conventional drilling depth measurement method, so that the drilling time occupied is relatively long; and as a result of limitation of the calibration method and the principle of the hanging load sensor, the depth error will be accumulated along with time. The embodiments of the description provide a well depth measurement method based on image recognition. The drilling tool and the top drive may be recognized automatically by the image recognition unit without mounting the winch sensor. The height of the top drive and the length of the drilling tool on the rotary table surface are measured automatically, and it is only two engineers needed to finish all operations, so that the needed time is short. The slips-sitting and slips-releasing states may be directly judged via the image recognition unit, the data processing unit and the state recognition unit without mounting the hanging load sensor, so that the measuring errors caused by abnormal change of hanging load in the special conditions are avoided.

Figure 5:
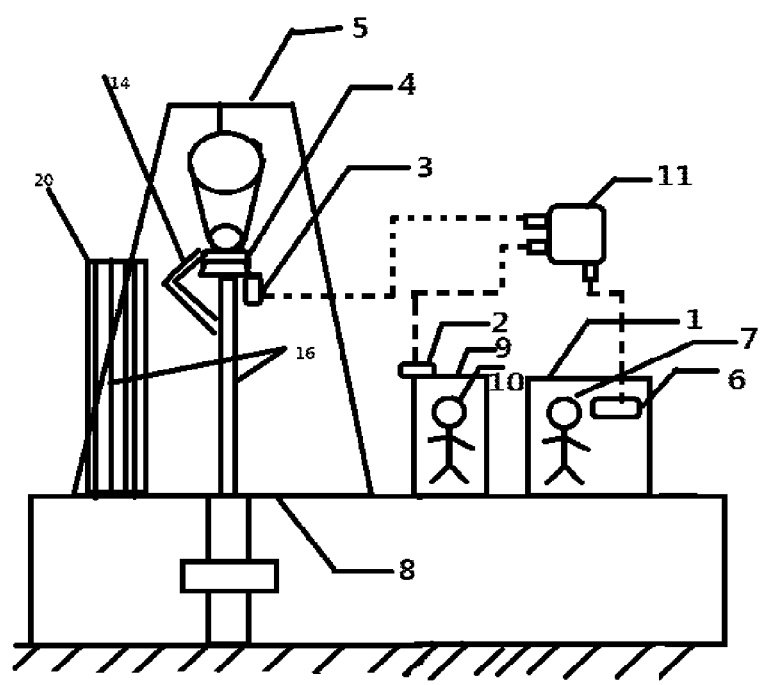
FIG. 5 is a structural schematic diagram of the drilling system provided by the embodiments of the description.

Referring to FIG. 5, it illustrates the structural schematic diagram of the drilling system provided by the embodiments of the description. The image acquisition unit 2 (may be a camera, replaced by the camera below) is mounted in a top position or a proper position of the driller room 9 so as to shoot the top drive system, the drilling tool and a drilling tool groove 20. The camera 2 transfers an image to the operating terminal 6 in a well-logging-during-drilling workshop 1 via a well site data processor 11, and the operating terminal 6 includes a plurality of units which may calculate slips-sitting or slips-releasing drilling state, the height of the top drive 4, the depth of the drill bit and the workshop in real time respectively. The laser diastimeter 3 is mounted on the top drive 4 for initial calibration, and is detached after calibration.

The method of the present invention has the calibration operating steps below:

1. The driller 10 may be informed to place the top drive 4 to the lowest point (the lowest point of the rotary table surface may be preset) from the rotary table surface 8 by the engineer 7, the laser diastimeter 3 is mounted, and the engineer 7 returns to the well-logging-during-drilling workshop 1, opens a calibration unit of the operating terminal 6 to start calibration work via the calibration unit.

2. The driller 10 may be informed to lift the top drive 4 to the highest point (the highest point of the derrick may be preset) of the derrick 5 by the engineer 7, and in the process, the image recognition unit of the operating terminal 6 receives the image transferred by the camera 2 in real time and recognizes a target size, a target boundary respectively includes the top drive 4 and the rotary table surface 8, the processing unit calculates a real time pixel quantity between the top drive 4 and the rotary table surface 8, and meanwhile, the calibration unit of the operating terminal 6 establishes a corresponding relationship table between the quantity of pixels of the target image and the true length according to the real-time height information transferred by the laser diastimeter 3 to finish the calibration process. Then, the height of the top drive 4 in any position may be deduced from the quantity of the known pixels according to the table. As the drill pipe of the drilling tool is placed under the top drive 4, the quantity of the pixels between the top surface of the drilling tool and the rotary table surface is recognized by using the image recognition unit, and the length and height of the drilling tool may be deduced by using the corresponding table. In addition, in the drilling process, a striking marker may be placed on the top drive 4 to improve the image recognition accuracy.

3. The driller 10 may be informed to place the top drive 4 to the lowest point (the lowest point of the rotary table surface may be preset) by the engineer 7, and the laser diastimeter 3 is detached.

Figure 6:
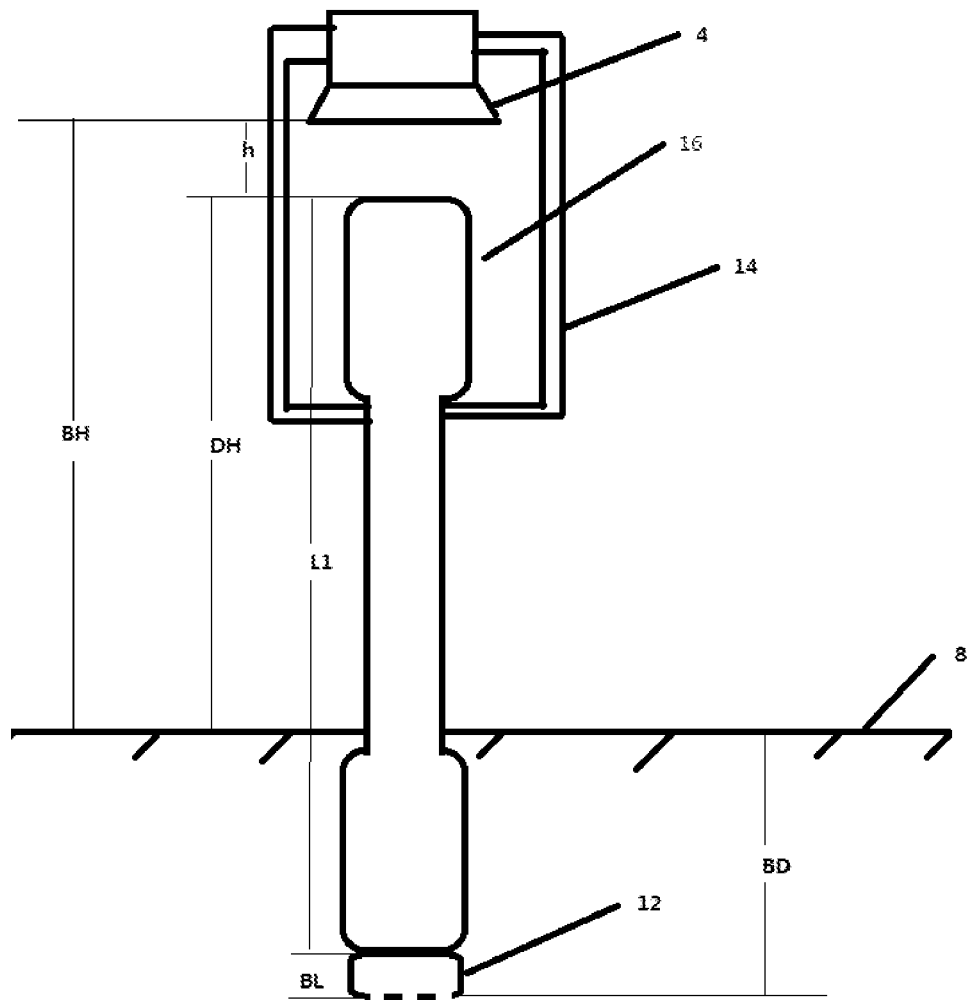
FIG. 6 is a schematic diagram I of a drill-down process provided by the embodiments of the description.
Figure 7:
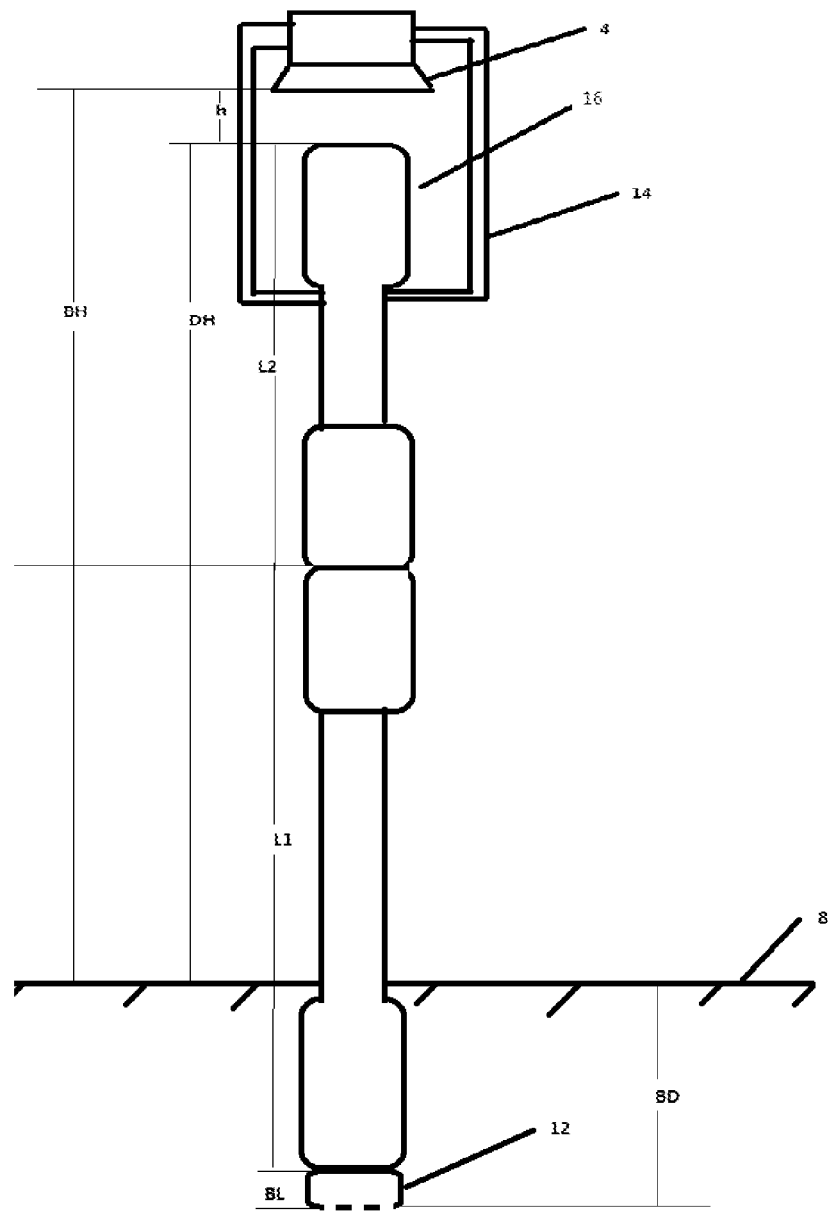
FIG. 7 is a schematic diagram II of a drill-down process provided by the embodiments of the description.

In the embodiments of the description, the intact drilling flow may be divided into three stages: the drill-down stage, the drilling stage and the pull-out-of-hole stage. From three aspects respectively below, how to calculate the height of the top drive 4, calculate the position of the drill bit, calculate the well depth and judge the drilling state in different stages in the embodiments of the description is described. The true drilling state mentioned below refers to the drilling state switching caused by a driller placing/extracting the slips, and the system drilling state mentioned below refers to drilling state switching by the state recognition unit. There is a time difference therebetween under different conditions. However, as within the time difference, the top drive 4 and the drilling tool do not move or move a slight distance, a calculating result is not affected. The drill-down process, the drilling process and the pull-out-of-hole process are shown as follows:

The well depth in the drilling process is a preset fixed value, the depth of the drill bit is started from zero, and referring to FIG. 6, it illustrates a schematic diagram I of the drilling process, referring to FIG. 7, it illustrates a schematic diagram II of the drilling process.

1. When the hook 14 clamps one drilling tool 16 from the drilling tool groove 20, after the drilling tool is vertically placed, the length L1 of the drilling tool may be recognized according to the method, the drill bit is connected, the length of the drill bit is recorded as BL, and when the position of the drill bit is aligned with the rotary table surface, the depth of the drill bit is recorded as zero, and the initial drilling state is set as the slips-releasing state.

2. The hook 14 drives the drilling tool 16 to move downwards, and referring to FIG. 6, the image recognition unit recognizes the distance DH from the top surface of the drilling tool 16 to the rotary table surface 8, the real-time height of the top drive 4 is BH and the real time depth of the drill bit BD is equal to $L_1+BL-DH$. In the process, the distance h between the top drive 4 and the top surface of the drilling tool 16 is stable and invariable.

3. The hook 14 drives the drilling tool 16 to move downwards to the lowest point, the slips is mounted on the rotary table surface, the drilling tool 16 is in a static state, and at the time, the true drilling state is the slips-sitting state, the hook 14 stretching towards two sides loosens the drilling tool 16, the hook 14 and the top drive 4 both move upwards, and when the top drive 4 starts to move upwards, the image recognition unit and the data processing unit recognize that the distance h between the top drive 4 and the top surface of the drilling tool is increased, the state recognition unit changes the drilling state to the slips-sitting state at the time; the inner state conversion in the drilling system lags behind the true condition, and at the moment, the depth of the drill bit BD is not changed, the height of the top drive 4 BH is increased, the top drive 4 moves upwards to the highest point, the second drilling tool is connected, and after the drilling tool is in the vertical state, the length of the drilling tool is recognized and recorded as $L_2$; after the second drilling tool is connected to the top surface of the first drilling tool, in image display, the top surface of the drilling tool in the lower portion of the image disappears, the top surface of the drilling tool appears on the upper portion of the image, the image recognition unit recognizes a new top surface of the drilling tool, as shown in FIG. 7, when the height difference h is stable and invariable, the drilling state in the drilling system is changed from the slips-sitting state to the slips-releasing state, and then the slips is taken out, the top drive 4 moves downwards, and the real-time depth of the drill bit is $BD=L_1+L_2+BL-DH$; and in the process, the system state is slightly ahead of true state switching, but the calculating result is not affected.

4. The processes are repeated, and in the drill-down process, the real-time depth of the drill bit is $BD=L_1+L_2+\ldots+L_n+BL-DH$.

Figure 8:
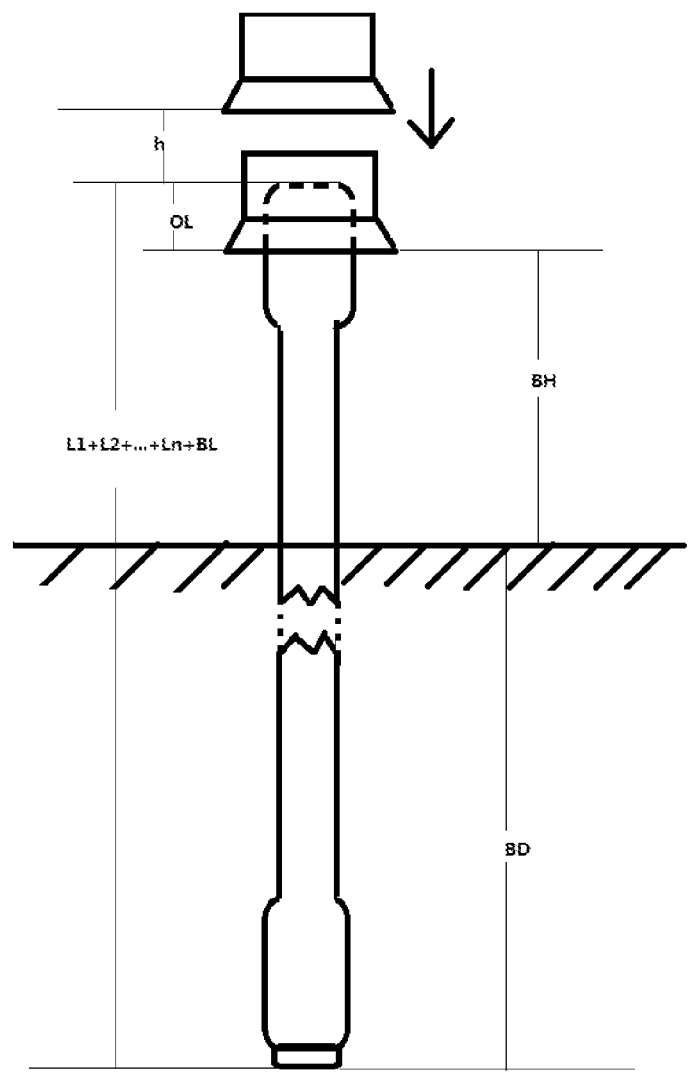
FIG. 8 is a schematic diagram of a drilling process provided by the embodiments of the description.

In the drilling process, the top drive 4 drives the drilling tool to rotate integrally and the hook 14 is retracted and released on one side, and is no longer used in the drilling process. When the last drilling tool drills down, it is necessary to make preparation below drilling. The top drive 4 is to be connected to the drilling tool to pump slurry. Referring to FIG. 8, it illustrates the schematic diagram of the drilling process.

1. The slips is placed on the rotary table surface 8, the whole drilling tool is static on the rotary table surface 8, the hook 14 loosens the drilling tool, the top drive 4 moves downwards to be connected to the drilling tool, and at the time, the data processing unit recognizes that the height difference h is changed, the drilling state is changed from the slips-releasing state to the slips-sitting state, and similarly, the state judging unit slightly lags behind the true drilling state conversion at the time. At the time, the depth of the drill bit is not changed, the height decrement of the top drive 4 is merely recorded, the height difference h is decreased to zero gradually, the top drive 4 may enter a female thread of the drilling tool to be locked by way of clockwise rotation, and the overlapped length therebetween is a fixed value OL which may be measured in advance, as shown in FIG. 8. The image unit recognizes that h at the time is zero, the drilling tool does not rotate, the top drive 4 rotating clockwise tracks and records the rotary angular speed, and when the angular speed is zero and the height of the top drive 4 is decreased to OL, the state recognition unit changes the drilling state from the slips-sitting state to the slips-releasing state, and the drilling system is slightly ahead of the true condition. After the top drive 4 and the top surface of the drilling tool are connected and locked, the slips is extracted, the image recognition unit no longer recognizes the top surface of the drilling tool under the condition that h is not zero, depth well calculation is based on the height BH of the top drive 4, the driller lifts the slips out, the top drive 4 is transferred downwards continuously, and at the time, the depth of the drill bit BD is equal to $L_1+L_2+ \ldots +L_n+BL-BH-OL$. When the depth of the drill bit is equal to the well depth, the drill bit enters a new stratum, and at the time, the well depth is increased equivalently along with increase of the depth of the drill bit.

2. When the drilling tool is driven to the lowest point, it is necessary to connect a new drilling tool to drill continuously. First, a sit slips is mounted on the rotary table surface, the top drive 4 may be separated from the drilling tool anti-clockwise, and at the time, the data processing unit recognizes that h at the time is zero, and the drilling tool does not rotate; when the top drive 4 starts to rotate anti-clockwise, the state recognition unit changes the drilling state from the slips-releasing state to the slips-sitting state, at the time, the drilling system lags behind the true condition, the top drive 4 rotates anti-clockwise to shackle to separate the drilling tool and move to the top end of the derrick upwards, in the process, the depth of the drill bit is not changed, the real-time height of the top drive 4 is merely recorded, the top drive system uses the hook 14 to clamp a new drilling tool, and after being in the vertical state, the image recognition unit and the data processing unit calculate the length L(n+1) of the new drilling tool; after the new drilling tool is connected to the original drilling tool, in image display, the top surface of the drilling tool in the lower portion of the image disappears, the top surface of the drilling tool appears on the upper portion of the image, the image recognition unit recognizes the new top surface of the drilling tool, the whole drilling tool is static on the rotary table surface, the hook 14 loosens the drilling tool, the top drive 4 moves downwards to be connected with the drilling tool, and at the time, the depth of the drill bit is not changed, and the height of the top drive 4 is merely recorded; the height of the top drive 4 and the height difference h of the top surface of the drilling tool are decreased continuously; when h is decreased to zero, the drilling tool does not rotate, and the top drive 4 rotating clockwise tracks and records the rotating angular speed; when the angular speed is zero and the height of the top drive 4 is decreased to OL, the drilling state is changed from slips-sitting state to the slips-releasing state, the top drive 4 is transferred downwards continuously after the slips is removed and the pump is started, and at the time, the depth of the drill bit BD is equal to $L_1+L_2+ \ldots +L_n+L_{n+1}+BL-BH-OL$.

3. The processes are repeated, and in the drill-down process, the real-time depth of the drill bit is $BD=L_1+L_2+ \ldots +L_n+ \ldots +L_m+BL-BH-OL$, wherein $L_m$ is the last drilling tool.

In the pull-out-of-hole process, the drilling depth is fixed and is not longer changed, and the depth of the drill bit is decreased from the maximum value to zero step by step.

1. When a pull-out-of-hole operation is carried out after drilling is finished, the pull-out-of-hole operation is similar to a drilling operation, but the directions are opposite. After drilling, the pump is stopped, the whole string of drilling tool sits the slips, the top drive 4 prepares to be separated from the drilling tool, and at the time, the data processing unit recognizes that h is zero, the drilling tool does not move, and the top drive 4 rotates anti-clockwise reversely. The state recognition unit changes the drilling state from slips-releasing state to slips-sifting state, state switching of the drilling system lags behind the true condition, after the top drive 4 is separated from the drilling tool completely, the top surface of the drilling tool is exposed, the hook 14 is used to clamp the drilling tool, the height difference h between the top drive 4 and the top surface of the drilling tool is increased, and when h is stable and invariable, the state recognition unit changes the drilling state from the slips-sitting state to the slips-releasing state, switching of the system state is ahead of true condition, the slips is extracted, the hook 14 drives the drilling tool to lift integrally, and the real-time depth of the drill bit BD is equal to $L_1+L_2+ \ldots +L_n+ \ldots +L_m+BL-DH$.

2. When the hook 14 is lifted to be near the highest point, the sit slips is mounted on the rotary table surface, the whole drilling tool is in the static state, the hook 14 moves downwards to transfer the weight of the whole drilling tool to the slips, and at the time, the height difference h displayed on the upper portion of the image is decreased, the state recognition unit changes the drilling state from the slips-releasing state to the slips-sifting state, switching of the drilling system lags behind the true state, the whole column is detached and is thrown back to the drilling tool groove 20, the top drive 4 moves downwards, h is decreased continuously, and after the hook 14 clamps the residual drilling tool string, h is stable and invariable, the state recognition unit changes the drilling state from the slips-sifting state to the slips-releasing state, the hook 14 drives the drilling tool to lift upwards integrally, and the real-time depth of the drill bit BD is equal to $L_1+L_2+ \ldots +L_n+ \ldots +L_{m-1}+BL-DH$.

3. The processes are repeated till the drill bit is out of the well.

Figure 9:
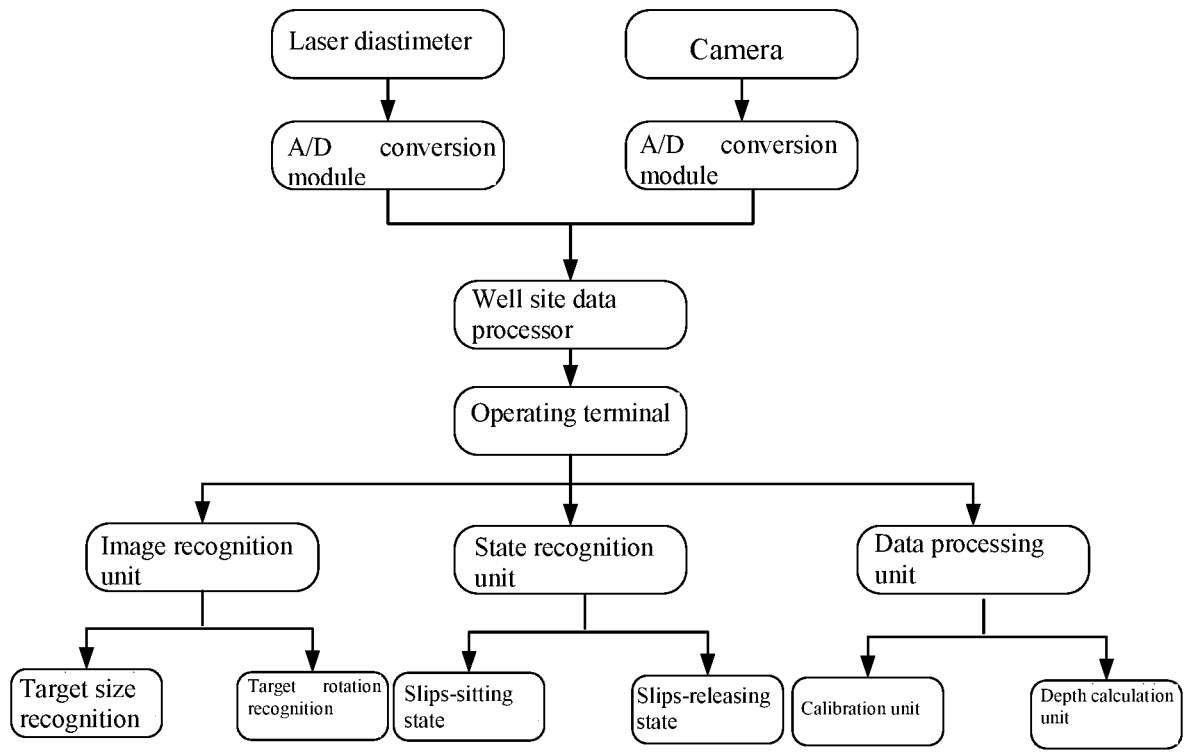
FIG. 9 is a structural schematic diagram of another drilling system provided by the embodiments of the description.

It is to be noted that referring to FIG. 9, it illustrates a structural schematic diagram of another drilling system, specifically including:

The laser diastimeter sends the measured height of the top drive to the well site data processor via an A/D conversion module, the camera sends the shot target image to the well site data processor via the A/D conversion module, the well site data processor sends the data to the operating terminal, the operating terminal may recognize the target size and target rotation via the image recognition unit, the data processing unit includes the calibration unit and the depth calculating unit, and the state recognition unit may convert the slips-sitting state and the slips-releasing state.

The embodiments of the description may reduce the labor force needed by calibration work, and four engineers are needed in the conventional method to cooperate to work, and in the embodiments of the description, only two persons are needed.

The embodiments of the description may shorten the time needed by depth calibration work, and in the conventional method, it is necessary to monitor the change condition of the mooring rope at a special time, and it is necessary to pause for many times repeatedly. When the embodiments of the description are implemented, it is unnecessary to pause, and the calibration time is shortened greatly.

It is unnecessary to mount the hanging load sensor and the winch sensor in the embodiments of the description, so that the depth measuring steps are simplified.

The embodiments of the description avoid depth errors under abnormal conditions, and the conventional method which recognizes the slips-sitting state and the slips-releasing state by using the hanging load sensor is an indirect recognition method. When drilling meets resistance or blockage, wrong response of the hanging load sensor will be caused. The embodiments of the description judge the slips-sitting or slips-releasing state directly by means of the image recognition technique and are irrelevant to tension of the drilling mooring rope, so that depth errors are avoided.

The embodiments of the description avoid the calibration errors caused by artificial recognition. It is necessary to pre-judge the change position of the mooring rope by the engineers during calibration, which may not be accurately done in reality. The embodiments of the description establish a calibration curve in real time by means of the image recognition technique and the high precision laser diastimeter without manual intervention.

The embodiments of the description avoid the calibration may further recognize the size of the object via the image by binding the object with known length to the drill pipe of the drilling tool to establish a conversion curve between the quantity of pixels and the true size by means of the object.

The embodiments of the description may judge the slips-sitting and slips-releasing state to replace the conventional hanging load sensor by means of the image recognition technique.

The embodiments of the description may establish the calibration curve by means of the image recognition technique to replace the conventional winch sensor.

The embodiments of the description may judge the slips-sitting state or the slips-releasing stat of the drilling state according to a change condition of the height difference between the top drive and the top surface of the drill pipe and relative angle rotation between the top drive and the drill pipe of the drilling tool.

Figure 10:
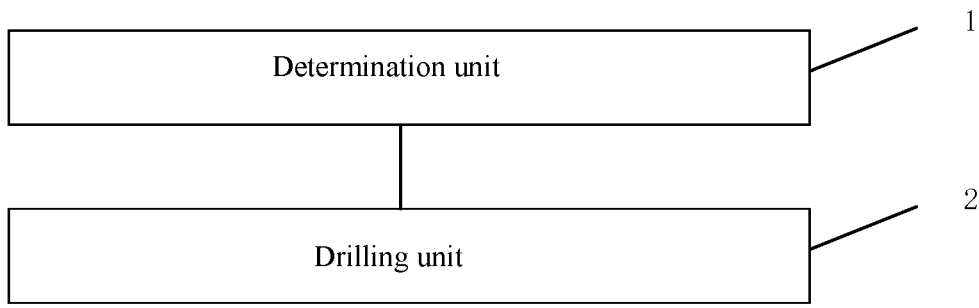
FIG. 10 is a structural schematic diagram of a drilling calibration apparatus based on image recognition provided by the embodiments of the description.

Corresponding to the embodiment in FIG. 1, FIG. 10 is a structural schematic diagram of a drilling calibration apparatus based on image recognition provided by the embodiments of the description. The apparatus includes a top drive moving unit 1, an image recognition unit 2, a data processing unit 3, a data receiving unit 4 and a calibration unit 5.

The top drive moving unit 1 is configured to lifting a top drive to a preset position of a derrick;

the image recognition unit 2 is configured to receive and recognize a target image acquired by an image acquisition apparatus;

the data processing unit 3 is configured to calculate a quantity of pixels from the top drive to a rotary table surface in the target image;

the data processing unit 4 is configured to receive a height of the top drive measured by a diastimeter, wherein the height of the top drive is a height from the top drive to the rotary table surface; and the calibration unit 5 is configured to establish a pixel relationship table between the quantity of the pixels from the top drive to the rotary table surface and the height of the top drive to finish drilling calibration.

The embodiments of the description provide a drilling calibration device based on image recognition, the device including:

at least one processor; and a memory in communication connection with the at least one processor, wherein the memory stores an instruction capable of being executed by the at least one processor, and the instruction is executed by the at least one processor, so that the at least one processor may:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

One or more embodiments of the description provide a drilling calibration medium based on image recognition, having a computer executable instruction stored thereon, the computer executable instruction being configured to:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

The above is merely the one or more embodiments of the description and is not limitation to the description. For those skilled in the art, various alternations and changes can be made on the one or more embodiments of the description. Any modification, equivalent replacement, improvement, etc. made within the spirit and principle of the one or more embodiments of the description shall be regarded as within the protection scope of the claims of the description.

The invention claimed is:

1. A drilling calibration method based on image recognition, the method comprising:

lifting a top drive to a preset position of a derrick, and receiving and recognizing a target image acquired by an image acquisition apparatus by an image recognition unit of an operating terminal;

calculating a quantity of pixels from the top drive to a rotary table surface in the target image by a data processing unit of the operating terminal;

receiving a height of the top drive measured by a diastimeter by the operating terminal, wherein the height of the top drive is a height from the top drive to the rotary table surface; and establishing a pixel relationship table between the quantity of the pixels from the top drive to the rotary table surface and the height of the top drive by a calibration unit of the operating terminal to finish calibration of drilling.

2. The drilling calibration method based on image recognition according to claim 1, wherein after finishing the drilling calibration, the method further comprises:

determining a length of a drilling tool exceeding the rotary table surface by the operating terminal according to the pre-established pixel relationship table, and finishing a drill-down stage, a drilling stage and a pull-out-of-hole stage of drilling according to the length of the drilling tool exceeding the rotary table surface, information of the drilling tool, a state recognition unit, an image recognition unit and a data processing unit, wherein
the information of the drilling tool comprises a quantity of the drilling tools and the length of each drilling tool;
the state recognition unit is configured to switch the drilling state so as to determine a drilling depth of a drill bit according to different drilling states;
in the drill-down stage, the drilling depth in the drill-down stage is set as a first preset value, so that the drilling depth of the drill bit is increased from zero to the first preset value;
in the drilling stage, the drilling tool is driven to rotate integrally by the top drive and the drilling depth is set as a second preset value, so that the drilling depth of the drill bit is increased from the first preset value to the second preset value; and
in the pull-out-of-hole stage, the drilling depth of the drill bit is decreased from the second preset value to zero.

3. The drilling calibration method based on image recognition according to claim 2, wherein the a drill-down stage specifically comprises:
vertically connecting the first drilling tool to a bottom of the top drive via a hook by the operating terminal, mounting the drill bit at the bottom of the first drilling tool, and recording lengths of the first drilling tool and the drill bit;
when the position of the drill bit is aligned with the rotary table surface, the drilling depth as zero is recorded by the operating terminal, and the drilling state is set as a slips-releasing state;
driving the first drilling tool to move downwards via the hook, and recognizing a distance from a top surface of the first drilling tool to the rotary table surface and a current height of the top drive by the image recognition unit;
calculating a current drilling depth of the drill bit according to the length of the first drilling tool, the length of the drill bit and the distance from the top surface of the first drilling tool to the rotary table surface, wherein the distance between the top drive to the top surface of the first drilling tool is stable and invariable;
when the first drilling tool is moved downwards to the lowest point via the hook, placing slips on the rotary table surface to fix the first drilling tool;
loosening the first drilling tool by the hook and moving the top drive, together with the hook, upwards;
recognizing a distance change between the top drive and the top surface of the first drilling tool by the image recognition unit and the data processing unit, and changing the drilling state to a slips-sitting state by the state recognition unit;
when the height of the top drive is moved upwards to the highest point, vertically connecting a second drilling tool to the top surface of the first drilling tool, and recording a length of the second drilling tool;
recognizing a top surface of the second drilling tool by the image recognition unit, when the distance between the top drive and the top surface of the second drilling tool is stable and invariable, changing the drilling state to the slips-releasing state by the state recognition unit, and taking the slips out for the convenience of movement of the top drive downwards, and calculating the current drilling depth of the drill bit; and executing the steps repeatedly, and reaching the drilling depth of drilling to the first preset value when the nth drilling tool is connected, wherein n is a positive integer greater than 1.

4. The drilling calibration method based on image recognition according to claim 3, wherein the drilling stage specifically comprises:
when the nth drilling tool is vertically connected to the top surface of the previous drilling tool, placing slips to the rotary table surface, and moving the top drive downwards to connect the nth drilling tool to pump slurry;
recognizing a distance change between the top drive and the top surface of the nth drilling tool by the image recognition unit and the data processing unit;
changing the drilling state to the slips-sitting state by the state recognition unit, wherein the depth of the drill bit is invariable, the height of the top drivel is decreased gradually, the distance between the top drive and the top surface of the nth drilling tool is decreased gradually to zero, and the top drive is connected to the top surface of the nth drilling tool by way of rotating a first preset direction;
recording an overlap value of an overlap portion between the top drive and the nth drilling tool by the operating terminal, and recording an angular speed of the top drive that rotates in the first preset direction;
when the image recognition unit and the data processing unit recognize that the overlap value is a preset overlap value and the angular speed of the top drive that rotates in the first preset direction is zero, switching the drilling state to the slips-releasing state and removing the slips;
determining the current drilling depth of the drill bit according to the length of the drill bit, a sum of the lengths of the n drilling tools, the current height of the top drive and the preset overlap value;
placing slips on the rotary table surface, wherein the top drive rotates along a second preset direction to separate the top drive from a drill pipe of the drilling tool, the state recognition unit switches the drilling state to the slips-sitting state, and furthermore, the depth of the drill bit is invariable and the top drive moves upwards to the top end;
vertically connecting the (n+1)th drilling tool to the top surface of the nth drilling tool and moving the top drive downwards to connect the (n+1)th drilling tool;
when the data processing unit recognizes that the distance between the top drive and the top surface of the (n+1)th drilling tool is zero, the (n+1)th drilling tool not rotating, and the top drive rotating along the first preset direction to drill the top surface of the drilling tool;
recording an overlap value of an overlap portion between the top drive and the (n+1)th drilling tool by the operating terminal, and recording an angular speed of the top drive that rotates in the first preset direction;
when the image recognition unit and the data processing unit recognize that the overlap value is a preset overlap value and the angular speed of the top drive that rotates in the first preset direction is zero, switching the drilling state to the slips-releasing state and removing the slips;
determining the current drilling depth of the drill bit according to the length of the drill bit, a sum of the lengths of the (n+1) drilling tools, the current height of the top drive and the preset overlap value; and
executing the steps repeatedly, and reaching the drilling depth of drilling to the second preset value when the last drilling tool is connected.

5. The drilling calibration method based on image recognition according to claim 4, wherein the pull-out-of-hole stage specifically comprises:

placing slips to the rotary table surface, and when the processing unit recognizes that the distance between the top surface of the last drilling tool and the top drive is zero, the last drilling tool is static and the top drive rotates along the second preset direction, changing the drilling state to the slips-sitting state by the state recognition unit;

when the top drive is separated from the last drilling tool, connecting the last drilling tool via the hook, when the distance between the top drive and the top surface of the last drilling tool is increased to be stable and invariable, changing the drilling state to the slips-releasing state by the state recognition unit, taking out the slips, driving all the drilling tools to lift integrally via the hook, and determining the current drilling speed of the drill bit;

when all the drilling tools are integrally lifted to the highest point, placing slips on the rotary table surface to fix all the drilling tools;

when the image recognition unit and the data processing unit recognizes that the distance between the last drilling tool and the top drive is decreased gradually, changing the drilling state to the slips-sitting state by the state recognition unit and finishing detachment of the last drilling tool; and executing the steps repeatedly till the first drilling tool to finish detachment of all the drilling tools.

6. The drilling calibration method based on image recognition according to claim 2, wherein the state recognition unit is configured to switch the drilling state, specifically comprising:

judging whether the distance between the top drive and the top surface of the topmost drilling tool is zero or not;

judging whether the distance between the top drive and the top surface of the topmost drilling tool is changed or not if it is judged that the distance between the top drive and the top surface of the topmost drilling tool is not zero;

judging that the drilling state is changed to the slips-sitting state when it is judged that the distance between the top drive and the top surface of the topmost drilling tool is changed; and judging that the drilling state is changed to the slips-releasing state if it is judged that the distance between the top drive and the top surface of the topmost drilling tool is not changed.

7. The drilling calibration method based on image recognition according to claim 6, wherein if it is judged that the distance between the top drive and the top surface of the topmost drilling tool is zero, the method further comprises:

monitoring the angular speed of the top drive and judging a rotating direction of the top drive;

monitoring a moving distance of the top drive if it is judged that the top drive rotates along the first preset direction, and judging whether the top drive moves at the preset overlap value or not;

judging that the drilling state is changed to the slips-releasing state if it is judged that the top drive moves at the preset overlap value; and judging that the drilling state is changed to the slips-sitting state if it is judged that the top drive rotates along the second preset direction.

8. A drilling calibration apparatus based on image recognition, the apparatus comprising:

a top drive, configured to lifting a top drive to a preset position of a derrick;

at least one processor configured to, receive and recognize a target image acquired by an image acquisition apparatus;

calculate a quantity of pixels from the top drive to a rotary table surface in the target image;

receive a height of the top drive measured by a diastimeter, wherein the height of the top drive is a height from the top drive to the rotary table surface; and establish a pixel relationship table between the quantity of the pixels from the top drive to the rotary table surface and the height of the top drive to finish drilling calibration.

9. A drilling calibration device based on image recognition, the device comprising:

at least one processor; and a memory in communication connection with the at least one processor, wherein the memory stores an instruction capable of being executed by the at least one processor, and the instruction is executed by the at least one processor, so that the at least one processor may:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish calibration of drilling.

10. A drilling calibration medium based on image recognition, having a computer executable instruction stored thereon, wherein the computer executable instruction is configured to:

lift a top drive to a preset position of a derrick, and receiving and recognizing a target image acquired by an image acquisition apparatus by an image recognition unit of an operating terminal;

calculate a quantity of pixels from the top drive to a rotary table surface in the target image by a data processing unit of the operating terminal;

receive a height of the top drive measured by a diastimeter by the operating terminal, wherein the height of the top drive is a height from the top drive to the rotary table surface; and establish a pixel relationship table between the quantity of the pixels from the top drive to the rotary table surface and the height of the top drive by a calibration unit of the operating terminal to finish drilling calibration.

* * * * *